US007373321B2

(12) United States Patent
Collings et al.

(10) Patent No.: US 7,373,321 B2
(45) Date of Patent: May 13, 2008

(54) SYSTEM AND METHOD FOR ELECTRONIC COMMERCE

(75) Inventors: Christopher Collings, Harbor City, CA (US); Brad LaComb, Torrance, CA (US); Anthony Layug, Redondo Beach, CA (US)

(73) Assignee: Ecost.Com, Inc., Plano, TX (US)

( * ) Notice: Subject to any disclaimer, the term of this patent is extended or adjusted under 35 U.S.C. 154(b) by 1276 days.

(21) Appl. No.: 10/077,491

(22) Filed: Feb. 15, 2002

(65) Prior Publication Data

US 2002/0128899 A1    Sep. 12, 2002

Related U.S. Application Data

(60) Provisional application No. 60/269,236, filed on Feb. 15, 2001.

(51) Int. Cl.
G06Q 40/00    (2006.01)
(52) U.S. Cl. .............................. 705/35; 705/26; 705/27
(58) Field of Classification Search ............ 705/35–40, 705/64–70, 26, 27, 10
See application file for complete search history.

(56) References Cited

U.S. PATENT DOCUMENTS

| | | | | |
|---|---|---|---|---|
| 5,710,887 A | * | 1/1998 | Chelliah et al. .............. 705/26 |
| 5,794,234 A | * | 8/1998 | Church et al. ................. 707/4 |
| 5,890,138 A | * | 3/1999 | Godin et al. .................. 705/26 |
| 5,909,023 A | * | 6/1999 | Ono et al. .................... 235/380 |
| 5,970,472 A | * | 10/1999 | Allsop et al. ................. 705/26 |
| 6,055,513 A | * | 4/2000 | Katz et al. .................... 705/26 |
| 6,266,649 B1 | * | 7/2001 | Linden et al. ................ 705/26 |

* cited by examiner

Primary Examiner—Kambiz Abdi
Assistant Examiner—Lindsay M. Maguire
(74) Attorney, Agent, or Firm—Blakely, Sokoloff, Taylor & Zafman

(57) ABSTRACT

A system and method for electronic commerce. In one embodiment, product data is received for a plurality of products and sales data is received for each of the products. A sales trend condition is calculated for each of the products based on a current time, the sales data for each of the products, and the product data for each of the products. A customer request to view the products is received, and a web page including a predetermined portion of the product data and a sales trend indicator representing the sales trend condition for each of the products is presented. The method may be implemented on a server computer which communicates with customer computing devices via a wide area network such as the Internet.

19 Claims, 3 Drawing Sheets

FIG. 2

SYSTEM AND METHOD FOR ELECTRONIC COMMERCE

RELATED APPLICATION

This application claims the benefit of United States Provisional Application No. 60/269,236 filed Feb. 15, 2001.

FIELD OF THE INVENTION

The invention relates to a system and method for electronic commerce. More specifically, the invention relates to a system and method for increasing customer excitement by providing goods for a limited period of time at a particularly low cost while indicating a sales trend status to viewing customers.

BACKGROUND OF THE INVENTION

As the Internet has grown popular in recent years, the increased usage of and participation in Internet based auctions have helped drive this popularity. Many Internet auction web sites provide a forum for sellers to sell goods to potential buyers at locations distant from the seller. Internet auctions may be exciting to potential buyers for a number of reasons, including watching the price rise as bids are placed and monitoring the decrease in available quantity as bids are placed. The main draw for many on-line auction bidders is the belief that the buyer is able to get a product for a low price. However, on these web sites, the seller is not known to the potential buyer, and, as such, the buyer takes a risk when making a purchase. That is, there is risk in bidding on an item from an unknown seller located across the country, the state or across the world. In addition, it is well known that the same item might go up for auction many times, and the price may vary depending on how many people or which people participate as buyers in the particular auctions. As such, a typical auction is driven by buyer demand which results in the buyers setting the price of the goods. In this typical auction, the seller sets the period of time for the auction including the start time and end time. Other auction web sites offer goods from web site approved sellers and/or from the company that runs the web site itself. In this way, the risk inherent in the seller making a bid and payment is reduced. However, with web site sponsored auctions, the price is still determined by the potential buyers and actual bidders on the item.

BRIEF SUMMARY OF THE INVENTION

A system and method for electronic commerce. In one embodiment, the method comprises receiving product data for a plurality of products and receiving sales data for each of the products. A sales trend condition is calculated for each of the products based on a current time, the sales data for each of the products, and the product data for each of the products. A customer request to view the products is received, and a web page including a predetermined portion of the product data and a sales trend indicator representing the sales trend condition for each of the products is presented. The method may be implemented on a server computer which communicates with customer computing devices via a wide area network such as the Internet.

BRIEF DESCRIPTION OF THE DRAWINGS

The features and advantages of the present invention will become apparent from the following detailed description of the present invention in which:

FIG. 2 illustrates a sample web page according to an embodiment of the invention described herein.

DETAILED DESCRIPTION

Figure 1:
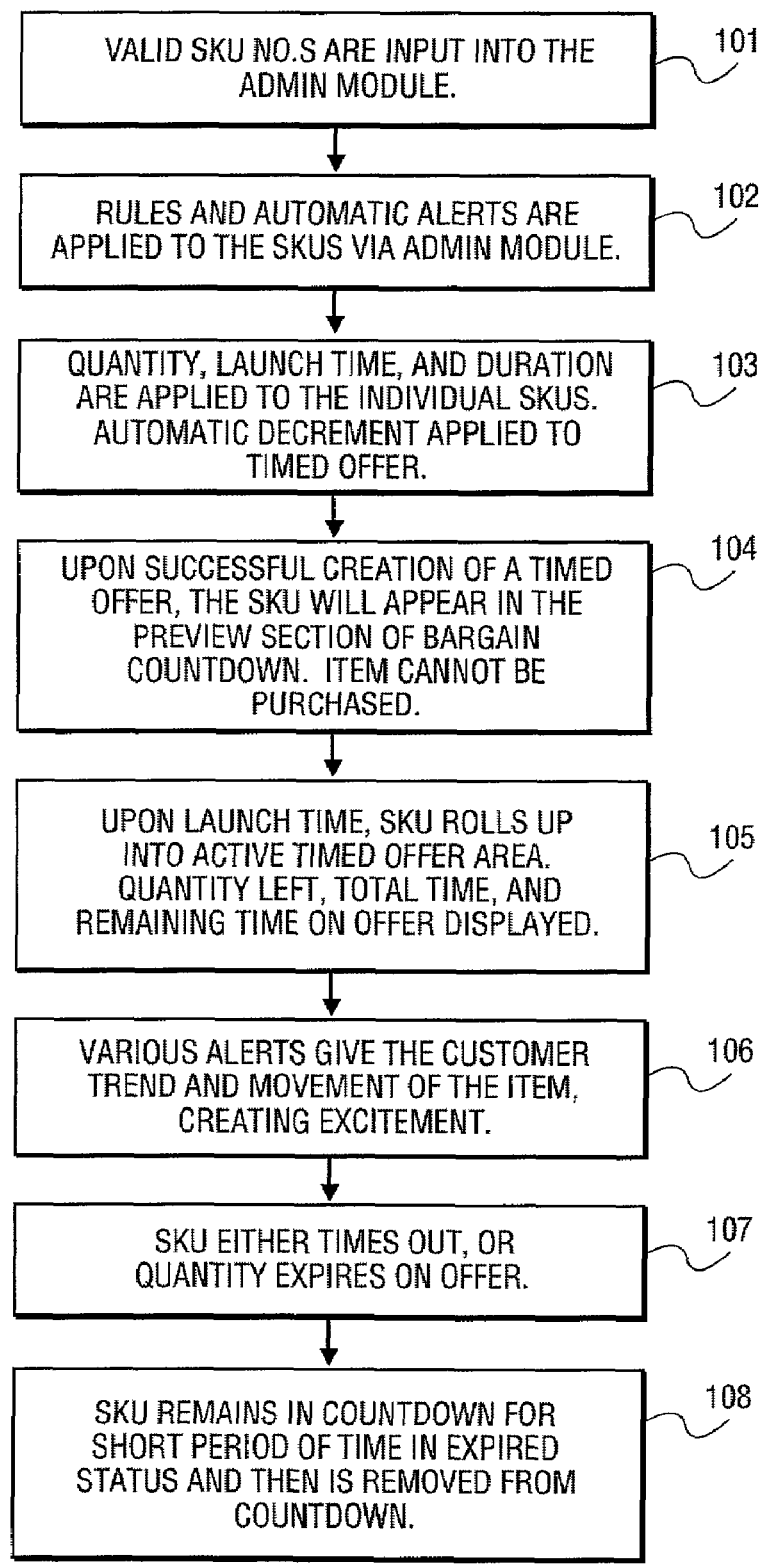
FIG. 1 illustrates the overall flow of actions taken in implementing an embodiment of the invention described herein.

The present invention is a unique Internet application of the "barker" sales concept, in which items are sold in both a time sensitive and quantity sensitive mode without the need for human involvement. The invention makes use of color, sound, and pictures to take maximum advantage of the Internet environment, so as to create a unique buying experience. The present invention is based on an auction concept providing below usual purchase price pricing combined with the power and excitement of shopping using the Internet but in a television like environment. The invention eliminates the risk of dealing with an unknown person which is typical of Internet style auctions.

The invention enables the offering of new items for sale having limited quantities and time for purchase. Potential customers can see live on a web site at any given time what quantity and how much time is remaining for a particular item. In one embodiment, items to be offered are announced in advance. In another embodiment, items available for purchase will just pop up on the web site without prior notice.

For each item or product available for purchase (identified by its stock keeping unit or SKU) entered into an administration module for a shopping environment using a web site referred to herein as "bargain countdown," a field containing all relevant product data is generated in a database on a server. When the bargain countdown web site is first accessed by a customer, the database is polled and a call is made to several different functions to draw data on the web page. The specific data which is drawn includes: Product Image, Manufacturer, Name, Description, SKU, Trend Status, Quantity Remaining, Start time, End Time, Time Remaining, Price, Detail Page Link, Buy Now Link, and Velocity. The above-noted data items are self explanatory except trend status. The trend status is determined by measuring real velocity and set velocity. Set velocity is the amount that would drive any given quantity to zero by the end of the allotted time. For instance, 100 units for 60 minutes would have a set velocity of 0.0278 per second. Real velocity is the tally of items sold in a particular period of time. The system takes the higher of the two measures. If real velocity was 0.0556 (e.g., 50 units in 15 minutes) in the above example, the system would alert the customer that the trend in real time indicates that the available quantity will expire with half the allotted time still remaining on the clock. In other words, the quantity is going to run out before the clock runs out.

In one embodiment, these alerts come in the form of trend status icons indicating the deal is "warm", "smoking", "hot" and "on fire." The customer may be provided a key that indicates what each trend icon means. If real velocity never exceeds set velocity, the customer is given the icon that indicates the item is in play and ready for sale, "available".

Some of these functions perform mathematic calculations that determine the current quantity based upon set and real velocities as defined herein. Set velocity is used to automatically remove items from a countdown field within the web page at a given rate. Real velocity is a number which represents the quantity of each product available for purchase which has been added to shopping carts of all customers currently participating. In this manner, a customer is able to see how many of a particular item have been purchased, how many are left and how quickly the item is moving, i.e., being purchased.

Additionally, demand is determined by the real velocity by rules established in the administration module. Rules are specific to time and quantity. When a certain level of real velocity is achieved, an image appears to indicate greater demand. This is not keyed to set velocity. The following is an example of the rules associated with a 100 unit sale with offered during a 60 minute time frame. The logic uses the last remaining true rule and executes and displays the new trend status to indicate demand for the product.

Rule 1- Available Status
  If (start time <current time) and (current time <end time) and (set velocity >real velocity)
  If true, display an "available" icon.
  This rule determines if the item is in active status, available for sale. If it is true, the available trend status icon is displayed.

Rule 2-Warm Status
  If real velocity >0.0281
  If true, display a "warm" icon.
  This rule determines if the item's real velocity will result in 1% to 19% of total time remaining on the clock with the quantity expired. If so, the warm trend status icon is displayed.

Rule 3-Smoking Status
  If real velocity >0.0347
  If true, display a "smoking" icon.
  This rule determines if the item's real velocity will result in 20% to 39% of total time remaining on the clock with the quantity expired. If so, the smoking trend status icon is displayed.

Rule 4-Hot Status
  If real velocity >0.0463
  If true, display a "hot" icon.
  This rule determines if the item's real velocity will result in 40 to 49% of total time remaining on the clock with the quantity expired. If so, the hot trend status icon is displayed.

Rule 5-On Fire
  If real velocity >0.0556
  If true, display an "on fire" icon.
  This rule determines if the item's real velocity will result in 50% or greater of total time remaining on the clock with the quantity expired. If so, the on fire trend status icon is displayed.

Rule 6-Finished
  If (current time >end time) or (current quantity =0)
  If true, display "finished" icon.
  This rule determines if quantity or time have expired. If so, the "finished" status icon is displayed.

Other rules are available, such as two minute warning, bonus offers, so forth. The developed interface allows for large latitude in the development of rules and the display of icons.

According to the method described herein, an auction "barker" concept is obtained electronically, without human intervention.

In one embodiment, when an item is added to a customer's shopping cart, checks are made so the customer is able to only purchase one of each countdown item per checkout. The customer is able to complete checkout, return to the bargain countdown web page, and if products are still available, purchase an additional one of each product.

When items are added to customer shopping carts, the database is updated to reflect the purchase. The adding of an item to a shopping cart will decrement the current quantity and the actual quantity, the difference being, the current quantity is what is displayed on the web page. This number represents what is available to customers and is modified by the number of items already purchased as well as the number of items removed from the auction via set velocity. The actual quantity represents actual products sold or more accurately, placed into customer shopping carts.

In one embodiment, the web page is built within a frameset. The top form is hidden. It is called "server view" and is responsible for querying the database, performing calculations, and building data results into <form>fields. The "client view" page calls the server view, gathers the data results, then displays this information for the customer. Because of the different features and browser capabilities, there is a separate client view for Netscape and Internet Explorer web browsers. In one embodiment, server view refreshes every 20 seconds, client view Internet Explorer refreshes every 7 seconds, and client view Netscape refreshes every 20 seconds. Netscape may have a longer refresh time because it has a tendency to redraw and/or jump the page. In one embodiment, Version 4.0 or higher web browsers are required to view the countdown web page in its auto updating format using java-script. In another embodiment, the method may be implemented as a non-java-script version that queries the database directly and requires a manual refresh to obtain the latest data. Refreshing any of the pages is not required but will display the most current data.

The remaining technical elements are links to the countdown web page, checks on the detail and search result pages for the items present within countdown, redirection to the countdown web page, and on/off switches nesting each of the features. Links in email tie directly into the countdown web pages identifying products for sale to customers.

FIG. 1 illustrates the overall flow of actions taken in implementing an embodiment of the invention described herein. A server provides an interface by which a seller may enter valid SKU numbers and other product data for products to be offered according to the bargain countdown system, and the seller inputs these SKU numbers into the administration module via this interface, as shown in block 101. The server then applies rules and automatic alerts are applied to the SKUs via the administration module, as shown in block 102. The quantity of each of the particular products, the launch time at which the sale began for each of the particular products, and the duration of the sale of each of the particular products are applied to the individual SKUs, and an automatic decrement is also applied to each of the times offers for each of the products, as shown in block 103. Upon successful creation of a timed offer, the SKU and a system defined portion of product data will appear in the preview section of the bargain countdown web page, however, the item cannot yet be purchased, as shown in block 104. The time at which a particular product may go on sale according to the bargain countdown system may be referred to as the launch time. Upon occurrence of the launch time, the SKU rolls up into the active time offer area of the bargain countdown web page, and in one embodiment a system defined portion of product data including the quantity left, the total time, and the remaining time on the offer for the particular product are displayed on the bargain countdown web page, as shown in block 105. Various alerts in the form of computer graphics and/or icons give the customer sales trend and movement information of the item, creating excitement for the customer, as shown in block 106. As time progresses, the SKU either times out or the quantity expires on the offer, as shown in block 107. After timing out or expiring, the SKU remains listed in the countdown web page for a short period of time with it's status listed as expired before the SKU is removed from the countdown web page, as shown in block 108.

Figure 2:
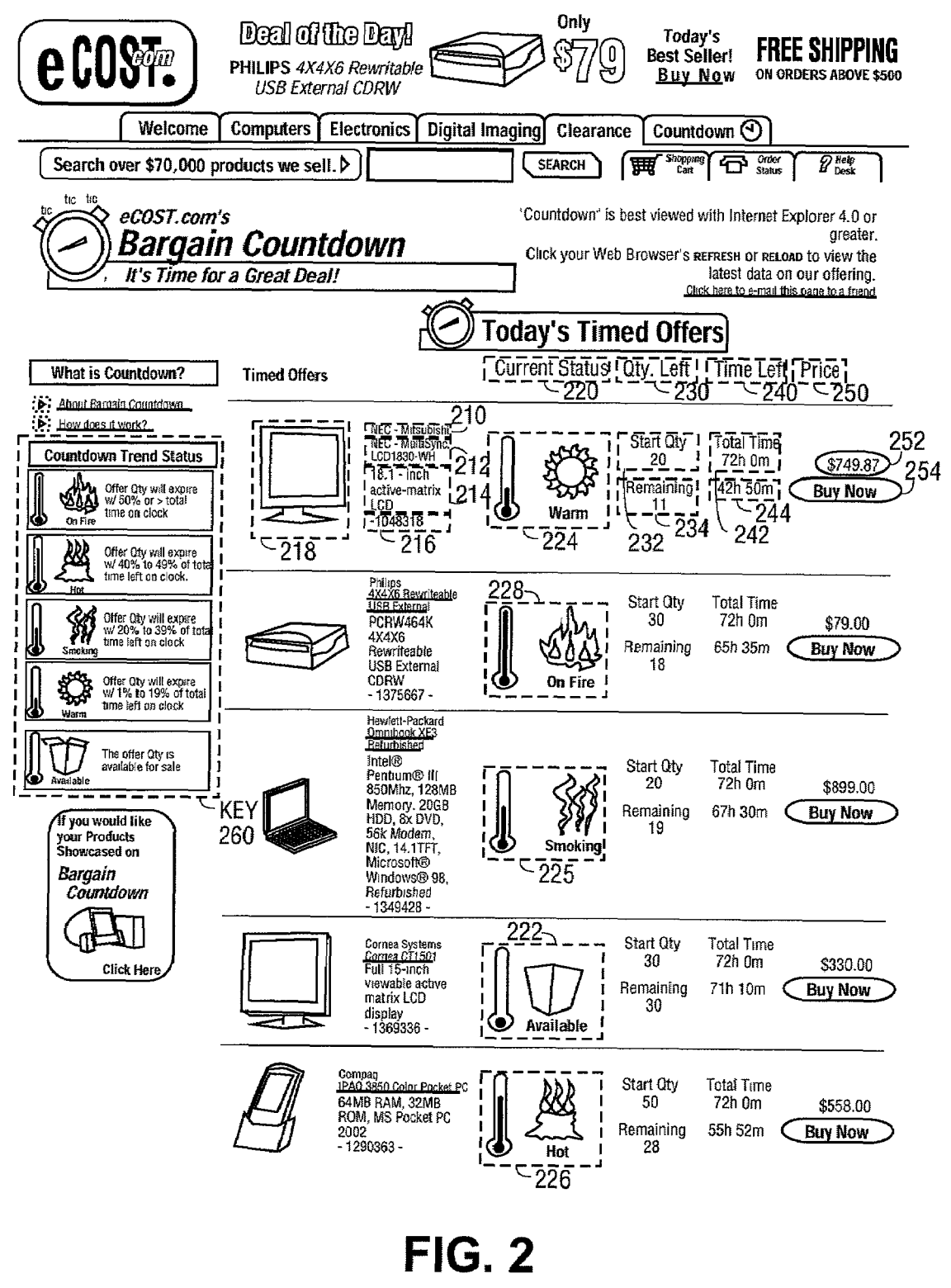

FIG. 2 illustrates a sample web page according to an embodiment of the invention described herein. In one embodiment, a bargain countdown web page may include all products that are currently available for a limited time period at a particular price. Columns of data may be provided to a user via the web page in which each product and its associated data are aligned in rows. In one embodiment, the columns include descriptive information about the product, current sale status of the product 220, quantity left 230, time left 240, and price 250. In one embodiment, the descriptive information includes a manufacturer 210, a product title 212, a product description 214, and a product identification or SKU number 216. In addition, a photographic image 218 of each of the products available may augment the product description. The current status column 220 may include each of a set of sales trend status icons or graphical images representing how fast each of the particular products is selling. For example, as described in more detail herein, the current status may be depicted as available 222, warm 224, smoking 225, hot 226 and on fire 228. How the sales trend status is determined is discussed herein above.

As to the other columns, the quantity left 230 may include data showing both the total quantity available at start 232, as well as the quantity remaining 234. The time left column 240 may include, for each product, the total time 242 for which the product will be for sale, as well as the time left in the sale 244. In the price column 250, a price for the particular item 252 may be provided. In addition, button 254 or other user interface graphic may be provided to allow for the purchase of the particular item. In addition to all of the information discussed regarding the bargain countdown web page, a key describing each of the current status indicators may be provided as shown by key 260.

Figure 3:
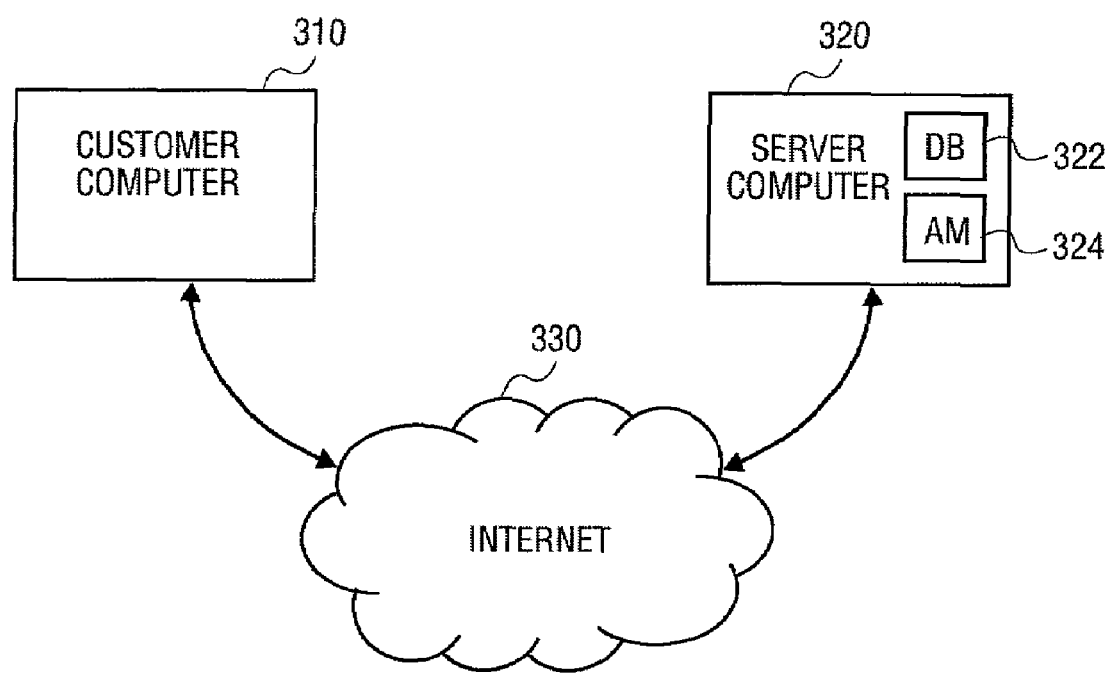
FIG. 3 illustrates a networked environment in which an embodiment of the invention described herein may be implemented.

FIG. 3 illustrates a networked environment in which an embodiment of the invention described herein may be implemented. A customer at customer computer 310 may specify a web site which is enabled by server computer 320 which executes the method described herein which may be implemented in software. As discussed above, the database 322 and administration module 324 may be included in the server computer that implements the method described herein. Customer computer 310 and server computer 320 are each coupled to the Internet 330 or other wide area network (WAN) and communicate with each other over the Internet. Customer computer 310 may be any computing device that can run an Internet web browser that provides for communication over the Internet, including personal computers, personal digital assistants, desktop computers, laptop computers, portable computers, cellular telephones, set top boxes, computing tablets, and the like. The details of and internal components of the hardware and software of customer computer 310, server computer 320 and Internet 330 are well known and are not set forth in detail so as not to obscure the invention described herein.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving product data for a plurality of products, said product data including a sale start time, a sale duration time and an initial quantity;
   receiving sales data for each of the products;
   calculating a sales trend condition for each of the products based on a current time, the sales data for each of the products, and the product data for each of the products, wherein the calculating is based on a plurality of rules, wherein the rules take into consideration a real sales velocity and a set sales velocity for each of the products, and the real sales velocity is determined by dividing for each of said plurality of products, a quantity sold by an elapsed time since said sale start time, and the set sales velocity is determined by dividing for each of said products the initial quantity by the sale duration time;
   receiving a customer request to view the products; and
   presenting a web page including a predetermined portion of the product data and a sales trend indicator representing the sales trend condition for each of the products.

2. The method of claim 1 wherein the sales trend status indicator is one of a plurality of graphic images, each graphic image representing the sales trend condition.

3. The method of claim 1 wherein the sales trend condition is one of a set of system defined conditions.

4. The method of claim 3 wherein the set of system defined conditions comprises:
   a first condition in which an offered quantity of a product will expire in a first time period that is less than 51 percent of a sale duration period;
   a second condition in which the offered quantity of the product will expire during a second time period that is between 51 and 60 percent of the sale duration period;
   a third condition in which the offered quantity of the product will expire during a third time period that is between 61 and 80 percent of the sale duration period;
   a fourth condition in which the offered quantity of the product will expire during a fourth time period that is between 81 and 99 percent of the sale duration period;
   a fifth condition in which the offered quantity is available;
   a sixth condition in which the offered quantity has expired or the sale duration period has expired.

5. The method of claim 1 wherein the product data further comprises a product name, a product description, a product photo.

6. The method of claim 1 wherein presenting the web page further comprises:
   displaying at least a product name, a quantity available, a quantity remaining, a sale duration, a time remaining, and a product photo for each of the products.

7. A method comprising:
   receiving product data for a plurality of products;
   receiving a customer request to view available products;

presenting a web page displaying a predetermined portion of the product data for a plurality of available products and a sales trend indicator for each of the available products, wherein the sales trend indicator represents a sales trend condition;

wherein the sales trend condition for each of said products is one of a set of system defined conditions:

wherein the set of system defined conditions comprises:

a first condition in which an offered quantity of a product will expire with less than 51 percent of a sale duration period remaining;

a second condition in which the offered quantity of the product will expire with between 51 and 60 percent of the sale duration period remaining;

a third condition in which the offered quantity of the product will expire with between 61 and 80 percent of the sale duration period remaining; and a fourth condition in which the offered quantity of the product will expire with between 81 and 99 percent of the sale duration period.

8. The method of claim 7 wherein the sales trend status indicator represents how quickly each of the available products is selling.

9. The method of claim 8 wherein the sales trend status indicator is one of a plurality of graphic images, each graphic image representing one of a plurality of sales trend conditions.

10. The method of claim 7 wherein the product data comprises at least a product name, a product description, a product photo, a sale start time, a sale time duration, and an initial quantity.

11. The method of claim 7 wherein the presenting further comprises: displaying at least a product name, a quantity available, a quantity remaining, a sale time duration, a sale time remaining, and a product photo.

12. The method of claim 7 wherein the presenting further comprises; calculating a sales trend condition for each of the products.

13. The method of claim 12 wherein the calculating is based on a plurality of rules.

14. The method of claim 13 wherein the rules take into consideration a real sales velocity and a set sales velocity for each of the available products.

15. A method comprising;

presenting product data for a plurality of available products;

receiving a customer purchase request for a selected one of the products;

updating a real sales velocity for the selected product responsive to said receiving;

updating a current quantity and an actual quantity based on at least one of a real sales velocity and a set sales velocity for the selected product;

applying a plurality of rules regarding the selected product to determine a product status;

presenting updated product data for said available products, the updated product data including the current quantity for the selected product and the product status for the selected product wherein:

the real sales velocity is determined by dividing a number sold of the selected product by an elapsed time since a sale start time, and the set sales velocity is determined by dividing an initial quantity of the selected product by a sale duration time set for the selected product.

16. The method of claim 15 further comprising:

decrementing the current quantity based on the set velocity; and decrementing the current quantity and the actual quantity based on the real velocity.

17. A system comprising:

a server computer coupled to a wide area network having instructions stored thereon which when executed cause the server to perform operations comprising:

receiving product data for a plurality of products, said product data including a sale start time, a sale duration time and an initial quantity;

receiving sales data for each of the products;

calculating a sales trend condition for each of the products based on a current time, the sales data for each of the products, and the product data for each of the products;

receiving a customer request to view the products, the customer request issued by a customer via a computing device coupled to the wide area network; and presenting a web page over the wide area network to the customer at the computing device, the web page including a predetermined portion of the product data and a sales trend indicator representing the sales trend condition for each of the products;

wherein the sales trend condition for each of the products is calculated based on a current time, the sales data for each of the products, and the product data for each of the products, wherein the calculating is based on a plurality of rules, wherein the rules take into consideration a real sales velocity and a set sales velocity for each of the products, and the real sales velocity is determined by dividing for each of said plurality of products, a quantity sold by an elapsed time since said sale start time, and the set sales velocity is determined by dividing for each of said products the initial quantity by the sale duration time.

18. The method of claim 17 wherein the sales trend status indicator is one of a plurality of graphic images, each graphic image representing the sales trend condition.

19. The method of claim 17 wherein the sales trend condition is one of a set of system defined conditions comprising:

a first condition in which an offered quantity of a product will expire in a first time period that is less than 51 percent of a sale duration period;

a second condition in which the offered quantity of the product will expire during a second time period that is between 51 and 60 percent of the sale duration period;

a third condition in which the offered quantity of the product will expire during a third time period that is between 61 and 80 percent of the sale duration period;

a fourth condition in which the offered quantity of the product will expire during a fourth time period that is between 81 and 99 percent of the sale duration period.

* * * * *